United States Patent [19]

Rhoads et al.

[11] Patent Number: 4,516,035
[45] Date of Patent: May 7, 1985

[54] PHASE SYNCHRONIZATION AND CONTROL CIRCUIT

[75] Inventors: Paul M. Rhoads, Orlando; Harold H. Cheffer, Longwood, both of Fla.

[73] Assignee: NCR Corporation, Dayton, Ohio

[21] Appl. No.: 525,369

[22] Filed: Aug. 22, 1983

[51] Int. Cl.³ .............................................. H02J 9/00
[52] U.S. Cl. .................................... 307/66; 323/241; 323/322; 307/87
[58] Field of Search ............... 307/44, 46, 48, 64, 307/66, 87; 323/241, 244, 235, 319, 322

[56] References Cited

U.S. PATENT DOCUMENTS

| | | | |
|---|---|---|---|
| 4,005,409 | 1/1977 | Feuer | 307/66 X |
| 4,087,697 | 5/1978 | Johnson | 307/66 |
| 4,241,261 | 12/1980 | Ebert, Jr. | 307/64 X |
| 4,400,625 | 8/1983 | Hussey | 307/87 X |

Primary Examiner—Patrick R. Salce
Assistant Examiner—Derek S. Jennings
Attorney, Agent, or Firm—J. T. Cavender; Wilbert Hawk, Jr.; Richard W. Lavin

[57] ABSTRACT

A circuit for generating control signals used in detecting a power failure in an uninterruptible power supply in which the A.C. signals of the power supply are examined to output a first signal representing the zero crossing of the A.C. signals. This first signal is used to reset an oscillator whose output clock signals are synchronized with the frequency of the A.C. signals by a phase lock loop circuit. The clock output of the phase lock loop circuit operates a counter whose output count is used to address a programmable read-only memory which outputs binary bits to a digital-to-analog converter which in turn outputs a full wave rectified sine wave operating at the system frequency which is used as a reference to detect the occurrence of a power failure in the main source of A.C. power signals. A second control signal is generated indicating a power failure condition which is used in switching an inverter into the power supply for supplying A.C. signals to a load.

9 Claims, 10 Drawing Figures

PHASE SYNCHRONIZATION AND CONTROL CIRCUIT

CROSS-REFERENCE TO RELATED APPLICATIONS

Snubber Circuit for Use In An Uninterruptible Power Supply, co-pending application, Ser. No. 525,371, filed on Aug. 24, 1983, invented by Harold H. Cheffer, assigned to the NCR Corporation.

High Frequency Inverter, co-pending application, Ser. No. 525,371, filed on Aug. 22, 1983, invented by Harold H. Cheffer, assigned to the NCR Corporation.

Power MOSFET Transfer Switch, co-pending application, Ser. No. 525,209, filed on Aug. 22, 1983, invented by Harold H. Cheffer, assigned to the NCR Corporation.

BACKGROUND OF THE INVENTION

1. Field of the Invention

The present invention is directed to uninterruptible power supplies and more particularly to a circuit for synchronizing the transfer of an alternating current to a load between an inverter supplying an alternating current from a storage source of direct current and an alternating current power line source.

2. Description of the Prior Art

In today's wide use of computers, data processors, controllers, etc. in data processing systems, it is extremely critical that the system be supplied with continuous power during its operation. Due to inadequate capacity and increasing load demands, commercially-supplied power is often subject to complete failure of the power signals or a reduction in the magnitude of the available voltage during peak demand periods. In cases where various customers subject the power system to sudden electrical loads, transients are generated in the system affecting the magnitude and phase of the supplied power signal.

Since the storage of data in a computer system is predicated on the continuous operation of the computer, power interruptions can adversely affect the integrity of the stored data. When the power drops abruptly, the computer will terminate operation probably with a high possibility of component damage. In order to overcome this situation, computers operating in a data processing system environment have been supplied with uninterruptible power supplies. Such uninterruptible power supplies have been designed where the primary commercial power source and the reserve power source are connected in parallel. Both the primary power source and the reserve power source are continuously operated and both sources contribute to the energizing of the load.

In a prior uninterruptible power supply arrangement, the power supply includes a commercial A. C. line power source and a D. C. voltage energized inverter power source connected in parallel to a switching mechanism which alternately couples one or the other of the two power supplies to a load to be energized. The auxiliary power source comprising the inverter must be synchronized in frequency with the A. C. power line signal which requires complicated synchronizing circuitry.

It is therefore a principal object of this invention to provide a circuit for synchronizing the transfer of power signals to a load between an inverter and an A. C. line source.

It is another object of this invention to provide a circuit for generating synchronizing signals which will allow an inverter to be switched in and out of phase with the line A. C. power signal within one-half cycle of operation.

It is a further object of this invention to provide a circuit for generating signals used in synchronizing the operation of the inverter which is simple in construction and low in cost.

SUMMARY OF THE INVENTION

These and other objects of the invention are accomplished by providing a circuit for controlling the switching of an inverter in an uninterruptible power supply into an A. C. input line which includes a comparator for establishing the time the system sine wave goes positive through zero voltage, and for generating a reference sine wave for use in detecting the occurrence of a power failure in the A. C. input line. The circuit further includes a programmable read-only memory for outputting binary data which is converted into a reference sine wave by a digital-to-analog converter in response to receiving binary data from a counter whose output is locked into the system frequency by a phase lock loop circuit. The output frequency of the phase lock loop circuit is used to synchronize the operation of the inverter.

DESCRIPTION OF THE PREFERRED EMBODIMENT

Figure 1:
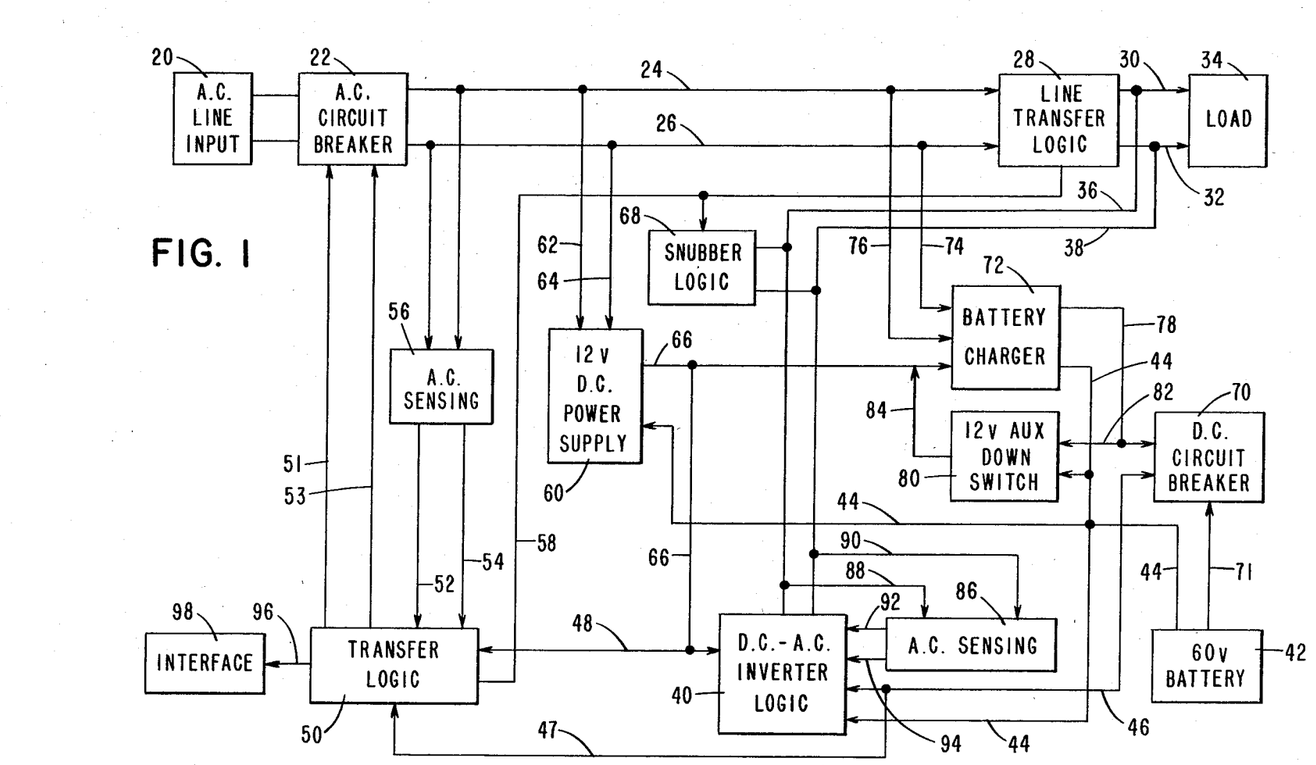
FIG. 1 is a block diagram of the uninterruptible power supply in which the synchronizing circuit of the present invention is utilized.

Referring now to FIG. 1, there is shown a block diagram of the uninterruptible power supply in which the synchronizing circuit of the present invention is found. Included in the power supply is the A. C. line input circuit 20 over which appears the A. C. power signals supplied from a commercial power source and which are transmitted through an A. C. circuit breaker 22 and over lines 24, 26 to a line transfer logic circuit 28 which controls the switching of the power source between an inverter and the commercial power source. The line transfer logic circuit 28 will output over lines 30, 32 to the load 34 an A. C. signal received over lines 24, 26 from the A. C. line input circuit 20. The load 34 also receives an A. C. signal transmitted over lines 36, 38 from a D. C. to A. C. inverter logic circuit 40 which, when enabled, will convert the D. C. signal output of a 60 volt battery 42 received over the common ground line 44 and line 46 to an A. C. signal. The inverter logic circuit is enabled by signals appearing on bus 48 when generated by a transfer logic circuit 50 which receives signals over lines 52, 54 from an A. C. sensing circuit 56 representing the signal level of the A. C. signals being outputted from the A. C. circuit breaker 22. The transfer logic circuit 50, in which is located the synchronizing circuit of the present invention, upon sensing a drop in the signal level of the line A. C. signal, will output control signals over bus 48 to the inverter logic circuit 40 and bus 58 to the line transfer logic circuit 28 enabling the inverter logic circuit 40 to output A. C. power signals over lines 36, 38 to the load 34 through lines 30 and 32. When the A. C. line input 20 returns to its normal power level, the transfer logic circuit 50 will enable the line transfer logic circuit 28 to switch back to the input lines 24, 26 allowing the A. C. line input circuit 20 to supply the power over lines 36 and 38 to the load 34. This switching of the line input circuit 20 occurs in phase with the original line frequency of the signal appearing at the line input circuit 20. The transfer logic circuit 50 outputs over lines 51, 53 signals for disabling the A. C. circuit breaker circuit 22 when a system overload occurs. The circuit 50 also outputs signals over line 96 to an interface circuit 98 indicating the operating condition of the power supply.

Further included in the power supply is a 12 volt D. C. power supply 60 which receives the A. C. power signals over lines 62 and 64 and converts them to a 12 volt D. C. signal which is supplied over line 66 to power the various logic circuits in the power supply. Also included in the power supply is the snubber logic circuit 68 which eliminates any abnormal current spikes which occur during the switching of the transfer logic circuit 28 between the A. C. line input circuit 20 and the inverter logic circuit 40. The circuit 68 receives control signals over bus 58 from the transfer logic circuit 50 and from the inverter logic circuit 40. Associated with the 60 volt battery 42 is a D. C. circuit breaker 70 connected to the battery 42 over line 71 and providing a current overload protection for the battery, a battery charging circuit 72 which converts the A. C. line signals appearing on lines 74, 76 to a charging current which is then supplied to the battery 42 over line 78 during the time the A. C. line power signals are available and a 12 volt auxiliary down switch 80 which supplies a 12 volt D. C. signal to power the logic circuits upon the failure of the A. C. line input. The switch 80 drops the 60 volt signal supplied over line 82 from the battery 42 through the circuit breaker 70 and outputs the 12 volt D. C. signal over lines 84 and 86 to the required logic circuits of the power supply.

Associated with the inverter logic circuit 40 is an A. C. sensing circuit 86 receiving over lines 88, 90 the A. C. signal output of the inverter logic circuit 40, the amplitude of such signals being used to regulate the amplitude and shape of the A. C. signals being outputted by the logic circuit 40. The sensing circuit 86 drops the A. C. output signal level appearing on lines 92, 94 to 5 volts, allowing the signal to be compared with the signals being outputted by the logic circuit 40.

Figure 4A:
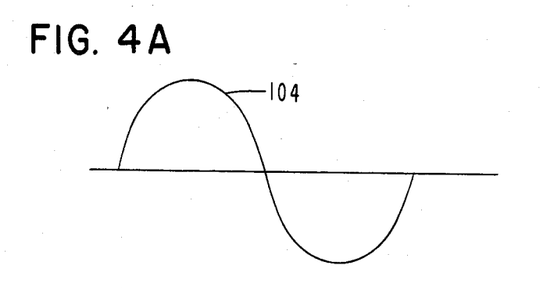
FIGS. 4A–4D inclusive disclose the waveforms of the output signals occurring during the operation of the synchronizing circuit.
Figure 4B:
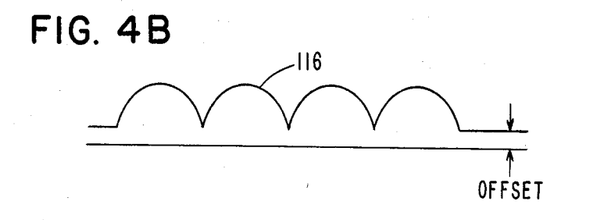

Referring now to FIGS. 2A-2D inclusive, there is shown the circuit for generating the control signals used in the operation of the uninterruptible power supply for supplying an A. C. power signal to an inductive load. Included in the circuit is a line transformer generally indicated by the numeral 100 (FIG. 2A) in which the primary windings 102 are connected over lines 52, 54 to the A. C. sensing circuit 56 (FIG. 1) for receiving the line A. C. power signals being outputted by the A. C. line input circuit 20. The transformer 100 steps down the 120 volt A. C. signals appearing on lines 52, 54 to 12 volts and couples the A. C. signal 104 (FIG. 4A) through the secondary windings 106 over lines 108, 110 to a pair of rectifying diodes 112, 114 which rectify the sine wave signal to produce the rectified sine wave signal 116 (FIG. 4B) offset from ground by 1 volt. This rectified sine wave signal is transmitted over line 118 through the dropping resistor 120 and the variable resistor 122 from where it is picked off by the slider 124 and transmitted over line 126 to the positive input of a comparator 128 which is part of an LM339 quad comparator circuit 130. The negative input of comparator 128 receives a reference rectified sine wave signal 132 (FIG. 4C) over line 134 through the dropping resistor 135 from a ZN 429 digital-to-analog converter circuit 136 (FIG. 2) which generates the signal 132 in a manner to be described more fully hereinafter. The adjustable resistor 122 adjusts the amplitude of the rectified sine wave signal 116 (FIG. 4B) while the adjustable resistor 138 establishes the off-set of the signal 116 to ground which is required to enable the signal to be used by the inverter logic circuit 40 (FIG. 1).

The comparator 128 comparing the amplitude of the rectified sine wave signal 116 (FIG. 4B) with the amplitude of the reference sine wave signal 132 (FIG. 4C) will output a low signal over line 140 when the amplitude of the signal 116 falls below the amplitude of the reference signal 132 indicating a failure of the line A. C. power source. The output signal appearing on line 140 is inputted into the positive input of a second comparator 142 which compares the level of the inputted signal to ground. The comparator 142 outputs a low signal over line 144 which discharges a capacitor 146 to the ground line 147 and is transmitted through the dropping resistor 148 over line 149 to the positive input of a second comparator 150 which compares the signal to a voltage level of 3 volts. The comparator 150 will output the low control signal POWER FAIL over line 152 (FIG. 2B) indicating the occurrence of a power failure and which controls the operation of the snubber logic circuit 68, the inverter logic circuit 40 and the line transfer logic circuit 28.

The A. C. power line signals 104 (FIG. 4A) appearing on the output line 108 of the secondary windings 106 of the transformer 100 are also transmitted over line 108, 154 through the resistor 156 and the rectifying diodes 158, 160 producing a rectified signal 162 (FIG. 4D) which varies between plus or minus 0.7 volts. This signal is transmitted over line 164 to the positive input of the comparator 166 which compares the signal to ground. When the positive portion of the signal 162 appears, the comparator 166 will output a high signal over lines 168 and 170 as the signal ZERO CROSSING representing the time the signal 104 (FIG. 4A) is going positive through the zero voltage line. This signal on line 170 is used by the line transfer logic circuit 28 in synchronizing the return of the line A. C. power signals to the system. When the A. C. line is returning to normal operation, the capacitor 146 (FIG. 2A) is charged through resistor 176 providing a time delay during which the comparator 128 outputs a high signal indicating the return of the A. C. input power source in addition to ensuring that the timing will occur at the zero crossing point of the sine wave 104. Further included in the circuit are the resistors 180, 182 (FIG. 2A) which form a voltage divider circuit for developing a 3 volt signal which is applied over line 184 to the negative input of the comparator 150. The pull-up resistor 186 pulls up the level of the output signal of comparator 150 appearing on line 132 to 12 volts, while diode 188 and resistor 190 provide a feedback signal to the positive input of the comparator 150. Resistor 148 isolates the output signal of comparator 142 from the input signal to the comparator 150 appearing on line 149 while the resistor 177 isolates the output signal of comparator 166 from the input signal appearing on line 164. The comparator circuit 130 is powered by a 12 volt power supply over line 192 (FIGS. 2A and 2B inclusive) through the dropping resistor 169 and a 5 volt power supply appearing on line 194 and transmitted through the dropping resistor 195.

Figure 2A:
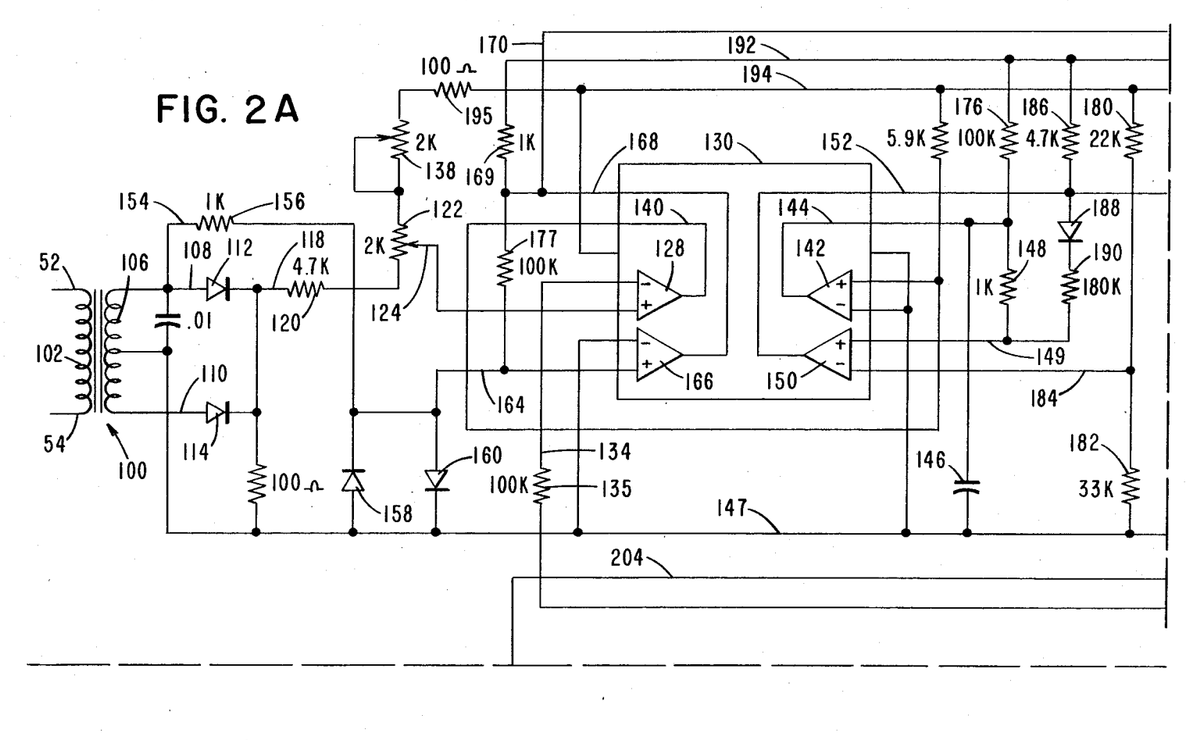
FIGS. 2A–2D inclusive, taken together, form a schematic representation of the synchronizing circuit of the present invention.
Figures 2B, 3:
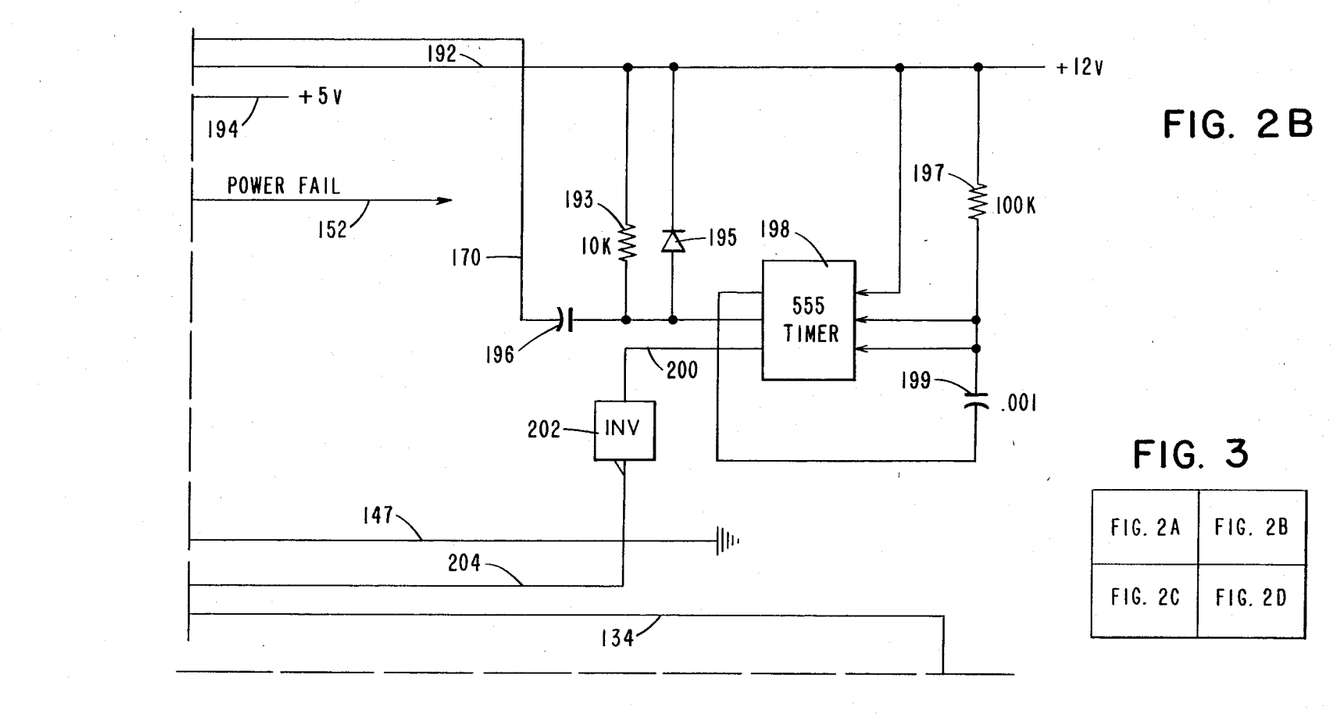
FIG. 3 is a diagram showing the manner in which FIGS. 2A–2D inclusive are arranged with respect to each other to form the synchronizing circuit.
Figure 2C:
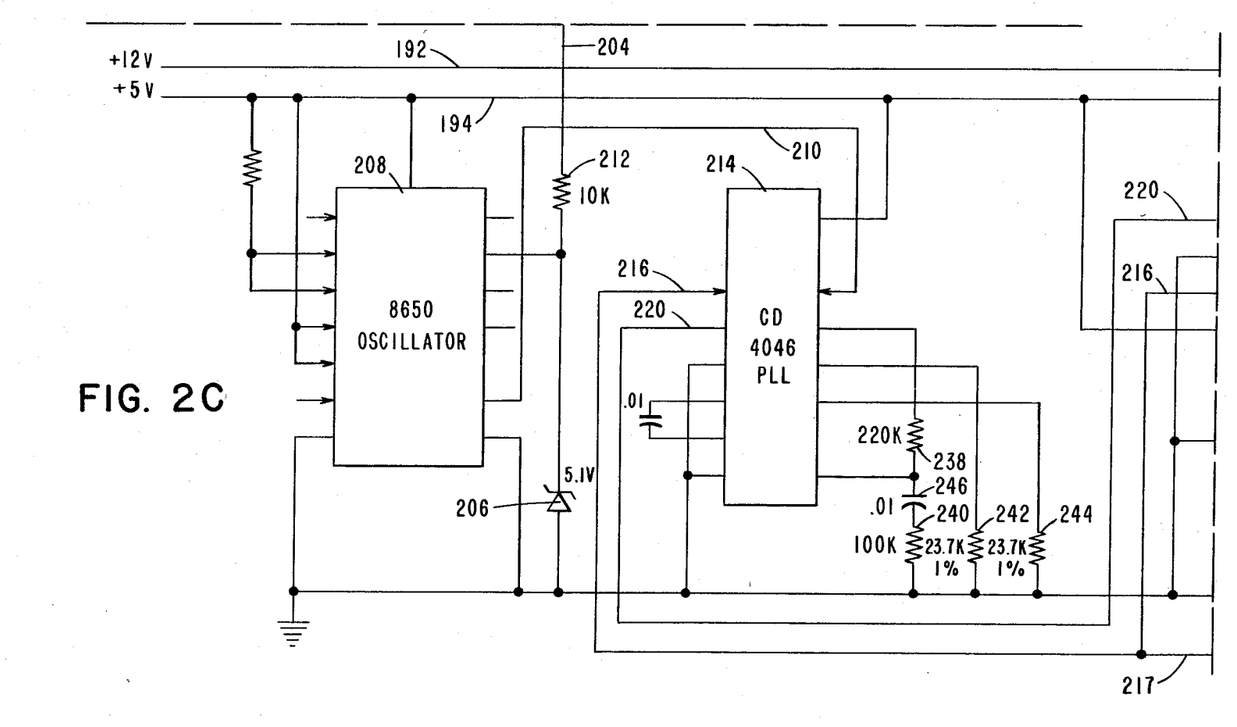
Figure 2D:
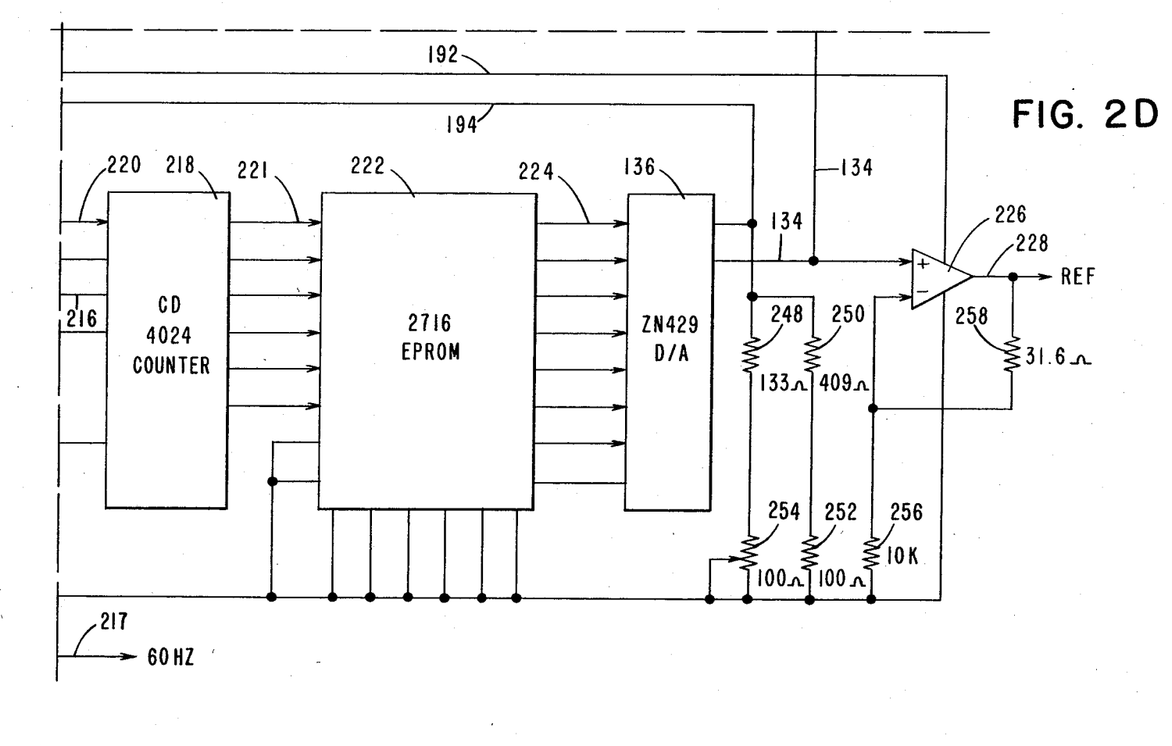

The signal ZERO CROSSING appearing on line 170 (FIG. 2B) is transmitted through the capacitor 196 to the input of a 555 timing circuit 198 which is port of the line transfer circuit 28 (FIG. 1). A resistor 193 holds the input line 170 at a 12 volt level except when the signal ZERO CROSSING occurs which pulls the signal on the input line down to zero. When the signal ZERO CROSSING is removed, a diode 195 holds the signal appearing on line 170 at 12 volts. The width of the signal outputted by the timing circuit 198 is controlled by the resistor 197 and capacitor 199. The timing circuit 198 will output the ZERO CROSSING signal over line 200, through the inverter 202 and over line 204, the dropping resistor 212 (FIG. 2C) and the zener diode 206 to an 8650 oscillator 208 which is reset by the signal to output 60 Hz. square wave clock signals representing the line frequency over line 210 to a CD 4046 phase lock loop circuit 214 which operates to lock in on the clock output of the oscillator 208. The phase lock loop circuit 214 includes a voltage controlled oscillator (not shown) generating a plurality of 60 Hz. clock pulses which are outputted over line 220 to a CD 4024 seven-stage counter 218 (FIG. 2D). The counter 218 divides down the input frequency of the clock signals and outputs over line 216 a 60 Hz. square wave clock signal to the phase lock loop circuit 214 enabling the circuit to lock onto the 60 Hz. clock output of the oscillator 208. The 60 Hz. clock pulses appearing on line 216 are also transmitted over line 217 (FIG. 2D) which is part of bus 48 (FIG. 1) to the inverter logic circuit 40 for synchronizing the operation of the circuit.

The counter 218 outputs over lines 221 six binary signals representing the output count of the counter 218 in which are inputted into a 2716 EPROM 222 which has been programmed to output eight binary signals over lines 224 which have been weighted so that when they are inputted into a ZN429 digital-to-analog converter 136, the rectified sine wave signal 132 (FIG. 4C) will appear on the output line 134 of the converter 136. This signal which is generated in phase with the line frequency is transmitted as a reference signal to the negative input of comparator 128 (FIG. 2A) for use in determining the time the A. C. line input falls below the reference signal in the manner described previously. The reference signal 132 (FIG. 4C) is also transmitted through a 2902 operational amplifier 226 and out over line 228 as the signal REF which is part of the bus 48 (FIG. 1) to the inverter logic circuit 40 where it is used in synchronizing the transfer of the inverter power signals to the load 34 and for the removal of the inverter power signals when the A. C. power line returns. The signal REF is also used in the operation of the snubber logic circuit 68 (FIG. 1).

The 60 Hz. time constant for the oscillator 208 (FIG. 2C) is controlled by an internal crystal oscillator. Resistors 238–244 inclusive and capacitor 246 control the response time and the frequency of the phase lock loop circuit 214 in locking the clock output of the oscillator 208 to the A. C. line frequency. The resistors 248–252 inclusive, and the variable resistor 254 (FIG. 2D) control the amplitude and the off-set of the sine wave signal 132 (FIG. 4C) outputted by the converter circuit 136 while the resistors 256 and 258 provide a gain of 3.16 for the amplifier 236.

In the operation of the circuit, the amplitude of the sine wave signal 104 (FIG. 4A) appearing on the A. C. line input circuit 20 (FIG. 1) and outputted by the transformer 100 (FIG. 2A) is rectified by the diodes 158, 160 and compared by the comparator 166 to ground, conditioning the comparator 166 to output a pulse every time the A. C. line signal goes positive through the zero voltage. This pulse, identified as the signal ZERO CROSSING, resets the square wave oscillator 208 (FIG. 2C) whose 60 Hz. output clock signals representing the system frequency are inputted into the phase lock loop circuit 214 which also receives clock signals over line 216 from the counter 218 generated at the system frequency, enabling the phase lock loop circuit to lock the system clock signals to the oscillator output frequency. The counter 218 initially receives clock signals from the phase lock loop circuit 214 set at a frequency 128 times that of the system frequency. The counter 218 comprising a seven-stage counter, down-counts the receive clock signals so that the clock signals outputted to the circuit 214 are at the 60 Hz. system frequency. During the operation of the counter 214, the counter also outputs a series of six binary signals to the programmable read-only memory 222 which outputs a series of 8 bit words to the digital-to-analog converter 136 which in turn outputs the rectified sine wave signal 132 (FIG. 4C) at the system frequency. This rectified sine wave signal output is used as a reference signal in switching between the line input circuit 20 (FIG. 1) and the inverter logic circuit 40 as the source of power for the load 34 (FIG. 1). The rectified sine wave signal 132 is also inputted into the comparator 128 (FIG. 2A) which compares the received signals 132 with the rectified sine wave signal 116 (FIG. 4B) received from the transformer 100 to sense the occurrence of a power failure. Upon such an occurrence, the low signal POWER FAIL is generated which is used by the line transfer logic circuit 28 (FIG. 1) to disable the A. C. line input circuit as a source of power to the load 34 while enabling the inverter logic circuit 40 to supply power to the load. This occurs instantaneously upon the generation of the signal POWER FAIL. It will thus be seen that the power supply is operated synchronously with the line frequency, enabling the inverter to be switched in and out of the A. C. input line without disrupting the power supplied to the load. In addition, the use of the programmable read-only memory 222 (FIG. 2D) provides the system with the versatility of being able to program whatever wave shape is required, thereby enabling the inverter to be inserted at the instant the power failure occurs.

Figure 4C:
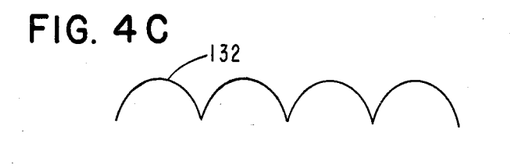
Figure 4D:
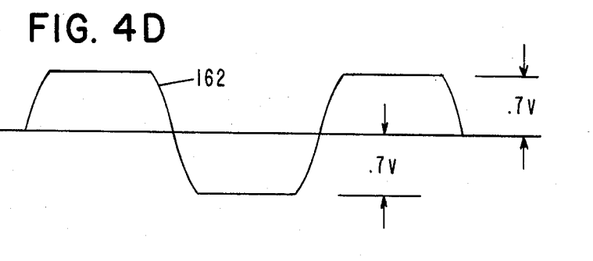

The following is the program listing for the 2716 EPROM 222 (FIG. 2D) in generating the sine wave signal 132 (FIG. 4C).

| Address | | Address | |
| --- | --- | --- | --- |
| Binary | Hexadecimal | Binary | Hexadecimal |
| 00000000 | 00 | 00011010 | 1A |
| 00000001 | 01 | 00100111 | 27 |
| 00000010 | 02 | 00110010 | 32 |
| 00000011 | 03 | 01000000 | 40 |
| 00000100 | 04 | 01001100 | 4C |
| 00000101 | 05 | 01011001 | 59 |
| 00000110 | 06 | 01100101 | 65 |
| 00000111 | 07 | 01110000 | 70 |
| 00001000 | 08 | 01111010 | 7A |
| 00001001 | 09 | 10000111 | 87 |
| 00001010 | 0A | 10010010 | 92 |
| 00001011 | 0B | 10011100 | 9C |
| 00001100 | 0C | 10100110 | A6 |
| 00001101 | 0D | 10110000 | B0 |
| 00001110 | 0E | 10111001 | B9 |
| 00001111 | 0F | 11000010 | C2 |
| 00010000 | 10 | 11001010 | CA |
| 00010001 | 11 | 11010001 | D1 |
| 00010010 | 12 | 11011000 | D8 |
| 00010011 | 13 | 11011111 | DF |
| 00010100 | 14 | 11100101 | E5 |
| 00010101 | 15 | 11101010 | EA |
| 00010110 | 16 | 11101111 | EF |
| 00010111 | 17 | 11110011 | F3 |
| 00011000 | 18 | 11110111 | F7 |
| 00011001 | 19 | 11111010 | FA |
| 00011010 | 1A | 11111100 | FC |
| 00011011 | 1B | 11111101 | FD |
| 00011100 | 1C | 11111110 | FE |
| 00011101 | 1D | 11111111 | FF |
| 00011110 | 1E | 11111111 | FF |
| 00011111 | 1F | 11111111 | FF |
| 00100000 | 20 | 11111110 | FE |
| 00100001 | 21 | 11111101 | FD |
| 00100010 | 22 | 11111100 | FC |
| 00100011 | 23 | 11111010 | FA |
| 00100100 | 24 | 11110111 | F7 |
| 00100101 | 25 | 11110011 | F3 |
| 00100110 | 26 | 11101111 | EF |
| 00100111 | 27 | 11101010 | EA |
| 00101000 | 28 | 11100101 | E5 |
| 00101001 | 29 | 11011111 | DF |
| 00101010 | 2A | 11011000 | D8 |
| 00101011 | 2B | 11010001 | D1 |
| 00101100 | 2C | 11001010 | CA |
| 00101101 | 2D | 11000010 | C2 |
| 00101110 | 2E | 10111001 | B9 |
| 00101111 | 2F | 10110000 | B0 |
| 00110000 | 30 | 10100110 | A6 |
| 00110001 | 31 | 10011100 | 9C |
| 00110010 | 32 | 10010010 | 92 |
| 00110011 | 33 | 10000111 | 87 |
| 00110100 | 34 | 01111010 | 7A |
| 00110101 | 35 | 01110000 | 70 |
| 00110110 | 36 | 01100101 | 65 |
| 00110111 | 37 | 01011001 | 59 |
| 00111000 | 38 | 01001100 | 4C |
| 00111001 | 39 | 01000000 | 40 |
| 00111010 | 3A | 00110010 | 32 |
| 00111011 | 3B | 00100111 | 27 |
| 00111100 | 3C | 00011010 | 1A |
| 00111101 | 3D | 00001101 | 0D |
| 00111110 | 3E | 00000000 | 00 |
| 00111111 | 3F | 00001101 | 0D |

The oscillator 208 is commercially available from Epson America, Inc. of Torrance, Calif.

The digital-to-analog converter 136 is commercially available from the Ferrarati Corporation, of Commack, N.Y. The remaining integrated circuits are commercially available from National Semiconductor Corporation of Mountain View, Calif.

Numerous modifications and adaptations of the system of the present invention will be apparent to those skilled in the art, and thus it is intended by the appended claims to cover all such modifications and adaptations which fall within the true spirit and scope of this invention.

We claim:

1. In an uninterruptible power supply which includes a main source of A. C. signals and an inverter for supplying A. C. signals to a load upon failure of the main source, a circuit for generating control signals used in switching the main source and the inverter to supply A. C. signals to the load including:

means for sensing the voltage level of the A. C. signals of the main source;

first means for comparing the voltage level of the A. C. signals to a zero voltage level for outputting a first control signal when a coincidence occurs;

means connected to said comparing means for generating a plurality of clock signals in response to the outputting of said first control signal;

counting means coupled to said signal generating means to output a count in response to receiving each of said clock signals;

storage means coupled to said counting means for outputting data signals in response to receiving each of said counts;

and means coupled to said storage means for converting said data to a referenced A. C. signal for use in detecting the failure of the main source to supply A. C. signals to the load.

2. The circuit of claim 1 which further includes:

means for disabling the main source of supplying A. C. signals to the load when actuated;

and second means coupled to said converting means for comparing the voltage level of the A. C. signals with the referenced A. C. signal to output a second control signal to said disabling means when a coincidence occurs thereby actuating said disabling means whereby the main source of A. C. signals is disabled from transmitting A. C. signals to the load.

3. The circuit of claim 2 which further includes timing means connected to said first comparing means and said signal generating means for outputting a third control signal to the generating means resetting said generating means to output said clock signals to said counting means in response to the generation of said first control signal.

4. The circuit of claim 3 in which said storage means comprises a programmable memory device storing a plurality of digital data words each representing a portion of a varying analog signal, said data words being stored at an address corresponding to one of the output counts of said counting means, said converting means comprising a digital-to-analog converter for outputting the reference varying analog A. C. signals in response to receiving the digital data words.

5. In an uninterruptible power supply which includes a main source of A. C. signals and an inverter for supplying A. C. signals from a D. C. source to a load upon failure of the main source to supply A. C. signals to the load, a circuit for generating control signals used to disable the main source from supplying A. C. signals to the load and for synchronizing the enabling of the main source to supply A. C. signals to the load comprising:

means for sensing the voltage level of the A. C. signals to the main source;

first means connected to said sensing means for comparing the voltage level of the A. C. signals to a zero voltage level for outputting a first control signal upon the occurrence of the coincidence;

oscillator means connected to said comparing means for outputting a plurality of first clock signals in response to receiving said first control signal;

a phase lock loop circuit connected to said oscillator means for outputting a plurality of second clock signals in response to receiving said first clock signals;

counting means connected to said phase lock loop circuit for outputting a count in response to receiving each of said second clock signals;

programmable memory means connected to said counting means for outputting a plurality of binary signals in response to receiving said count;

and means connected to said memory means for converting said binary signals to a referenced A. C. signal for use in detecting the failure of the main source to supply A. C. signals to the load.

6. The circuit of claim 5 which further includes:

means for disabling the main source from supplying A. C. signals to the load;

second means connected to said sensing means and said converting means for comparing the voltage level of the A. C. signals with the referenced A. C. signals to output a second control signal when a coincidence occurs;

and third means connected to said second comparing means for comparing the second control signals to a plurality of predetermined voltage levels for outputting a third control signal to said disabling means when the voltage level of said second control signals exceeds said predetermined voltage levels whereby the main source of A. C. signals is disabled from transmitting A. C. signals to the load.

7. The circuit of claim 6 which further includes timing means connected to said first comparing means and said oscillator means for outputting a fourth control signal to the oscillator means in response to the generation of said second control signal for resetting said oscillator means to output said clock signals to said counting means.

8. The circuit of claim 7 in which said memory means comprises an erasable programmable read-only memory storing a plurality of data words each comprising a plurality of binary bits, each data word representing the signal level of a varying analog signal wherein each of said data words is being stored at an address corresponding to one of the output counts of said counting means.

9. The circuit of claim 8 in which said converting means comprises a digital-to-analog converter.

* * * * *